to the brake

INVENTOR.
Josef Koppel

Patented May 14, 1940

2,200,625

UNITED STATES PATENT OFFICE 2,200,625

STEERING WHEEL BRAKE

Josef Koppel, Westwood, N. J.

Application August 29, 1938, Serial No. 227,359

3 Claims. (Cl. 74—487)

This invention relates, in general, to vehicle brakes and, in particular, to a new and improved manual actuator therefor.

One of the objects herein is to provide a new and improved vehicle brake actuator which is more readily accessible for actuation than heretofore and which, therefore, tends toward safer vehicle operation.

Another object is to provide a new and improved vehicle brake actuator which is located in the vicinity of the steering wheel and operable in any position of the latter with equal effectiveness either while said wheel is being turned or while it is stationary.

Another object is to provide a new and improved brake actuator which is equally as simple in its construction as it is efficient in operation and which is capable of being manipulated with ease and rapidity from any of a series of arcuate positions about and adjacent the steering wheel of the vehicle provided therewith.

Figure 1:
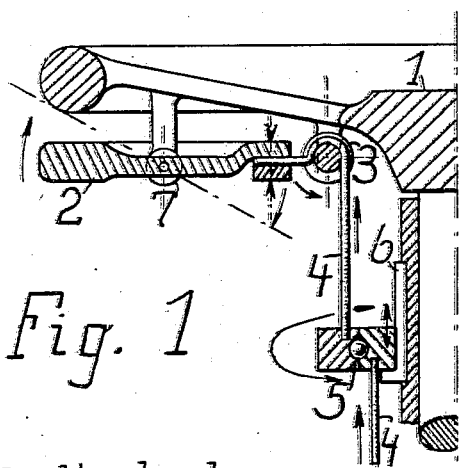
Figure 2:
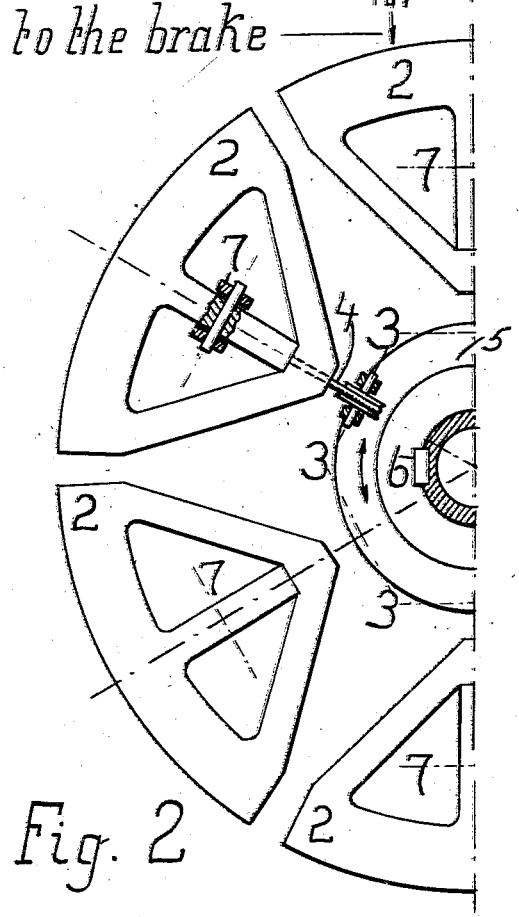

Other objects and advantages of the invention will become readily apparent from a reference to the following specification taken in conjunction with the accompanying sheet of drawings wherein:

Figure 1 is a vertical section of the steering wheel and column and showing details of the invention assembled thereon; and Fig. 2 is a plan view of the showing in Fig. 1 with the steering wheel removed therefrom, some of the elements being sectioned to illustrate more clearly their construction.

On the conventional steering wheel 1 of a vehicle there is carried a plurality of arcuately spaced levers 2, each of said levers being preferably shaped at its outer end to form normally with the others a substantially continuous, annular surface which may be gripped at any position therearound by the operator simultaneously with and at any position around the entire rim surface of said wheel, and each of said levers being pivoted intermediate its ends for movement about an axis parallel with the plane of said wheel to a support 7 formed on said wheel intermediate its rim and hub portions. The levers 2, therefore, are individually movable about their pivoted axes, but are movable as a unit with and during the movement of the wheel 1.

The levers 2 extend radially from the non-rotatable steering column which encloses the steering spindle to which the wheel 1 is fixedly and rotatably mounted, and to the inner end of each of said levers there is fixedly secured the upper end of a coupling 4, such as a length of rope, said couplings, intermediate their ends, each being preferably and individually carried over one of a plurality of pulleys 3 mounted on said wheel in annularly spaced relation to each other adjacent the hub portion thereof. The lower end of each of the couplings 4 is anchored to the outer member, section or race of a ball bearing unit 5 carried on the steering column.

The bearing unit 5 consists of the usual outer and inner sections frictionlessly inter-supported, the outer section, as has been said, being connected to the couplings 4, and the inner section, as has been said, being mounted about the steering column, there being a key or guide 6 provided between said inner section and said column whereby said section is free to move axially along said column in either direction but is prevented from rotation thereabout. The outer section of the bearing unit 5 moves, of course, with the inner section in an axial direction and, in addition, moves rotatably about said inner section. This means that the unit 5 as a whole moves along the guide 6 in accordance with the pivotal movement of all or less than all of the levers 2 and that the outer section thereof is free to rotate about and with respect to the inner section thereof in accordance with the turning of the wheel 1.

To the inner, non-rotatable section of the bearing unit 5 there is secured the upper end of another coupling 4 which leads therefrom and is secured in any suitable manner to means (not shown) whereby a pull on said coupling, by actuating any or all of the levers 2, will operate the brake or brakes (not shown) of the vehicle.

Although the invention has been described with some detail it is not intended that such description is to be definitive of the limits of the inventive idea. The right is reserved to make such changes in the details of construction and arrangement of parts as will fall within the purview of the attached claims.

I claim:

1. In combination with a steering column, a steering wheel and a wheel brake, a device for actuating the brake comprising, an anti-friction bearing member having an inner section and an outer section, said inner section being non-rotatably mounted about the steering column for movement therealong, said outer section being rotatably carried by said inner section for movement therewith, a manually operable lever pivotally connected intermediate its ends to the steering wheel and movable with the latter with respect to the steering column, means interconnecting said outer section and an end of said lever for moving said sections as a unit along the steering column in accordance with the pivotal movement of said lever and for rotatably moving said outer section relatively to said inner section in accordance with the unitary rotatable movement of the steering wheel and said lever, guide means for said first means and carried by the wheel between said outer section and the pivotal connection between said lever and the wheel, and means interconnecting said inner section and the brake for controlling the latter in accordance with the unitary movement of said sections along the steering column.

2. In combination with a steering column, a steering wheel and a wheel brake, a device for actuating the brake comprising, an anti-friction bearing member having an inner section and an outer section, said inner section being keyed to against rotation about the steering column and being movable therealong, said outer section being rotatably carried by said inner section for movement therewith, a lever extending radially from the steering column and being pivotally connected intermediate its ends to the steering wheel and movable with the latter about and with respect to the steering column, said lever being manually operable at its outer end and having means interconnecting its inner end with said outer section for moving said sections as a unit along the steering column in accordance with said manual operation of said lever and for rotatably moving said outer section relatively to said inner section in accordance with the unitary rotatable movement of the steering wheel and said lever, guide means for said first means and carried by the wheel between said outer section and the pivotal connection between said lever and the wheel, and means interconnecting said inner section and the brake for controlling the latter in accordance with the unitary movement of said sections along the steering column.

3. In combination with the steering column, steering wheel and wheel brake of a vehicle, a device for controlling the operation of the brake comprising, a plurality of levers arcuately spaced about the column and extending radially therefrom, said levers being individually pivoted intermediate their ends to and carried by the wheel, the outer end of each of said levers being manually operable for moving said lever about its pivotal axis and the inner end of each of said levers having a coupling for transmitting the pivotal movement of said lever and the unitary movement of said lever and the wheel, an annular member secured to said couplings and movable about and along the column in accordance therewith, a second annular member nonrotatably carried about the column but movable therealong, said second member supporting said first member for movement thereabout and for movement therewith along the column, and means interconnecting said second member and the brake for actuating the latter in accordance with the movement of the former.

JOSEF KOPPEL.